US012776596B2

(12) United States Patent
Hu et al.

(10) Patent No.: US 12,776,596 B2
(45) Date of Patent: Oct. 27, 2026

(54) CONDUCTIVE TERMINAL

(71) Applicants: TE Connectivity Germany GmbH, Bensheim (DE); Tyco Electronics (Shanghai) Co., Ltd., Shanghai (CN)

(72) Inventors: Chunjie Hu, Shanghai (CN); Tongbao (Tim) Ding, Shanghai (CN); Yongjian (Justin) Huang, Shanghai (CN); Thomas Klenner, Bensheim (DE)

(73) Assignees: Tyco Electronics (Shanghai) Co., Ltd., Shanghai (CN); TE Connectivity Solutions GmbH, Schaffhausen (CH)

( * ) Notice: Subject to any disclaimer, the term of this patent is extended or adjusted under 35 U.S.C. 154(b) by 583 days.

(21) Appl. No.: 18/467,803

(22) Filed: Sep. 15, 2023

(65) Prior Publication Data

US 2024/0097354 A1 Mar. 21, 2024

(30) Foreign Application Priority Data

Sep. 15, 2022 (CN) ......................... 202211123406.X

(51) Int. Cl.
*H01R 4/28* (2006.01)
*H01R 13/639* (2006.01)

(52) U.S. Cl.
CPC ............. *H01R 4/28* (2013.01); *H01R 13/639* (2013.01)

(58) Field of Classification Search
CPC ............................ H01R 4/2455; H01R 4/2454
See application file for complete search history.

(56) References Cited

U.S. PATENT DOCUMENTS 3,979,615 A * 9/1976 Neff ..................... H01R 4/2445 439/444
6,800,973 B2 * 10/2004 Futami ................. H01R 4/2458 310/71

(Continued)

FOREIGN PATENT DOCUMENTS

CN 208226137 U 12/2018
CN 212968136 U 4/2021

(Continued)

OTHER PUBLICATIONS

Chinese Office Action with English translation dated May 1, 2026, corresponding to Application No. 202211123406.X, 13 pages.

*Primary Examiner* — Neil Abrams
(74) *Attorney, Agent, or Firm* — Barley Snyder

(57) ABSTRACT

A conductive terminal includes a first pair of clamping arms forming a first clamping portion for connecting with a wire, and a second pair of clamping arms connected to the first pair of clamping arms by a connecting part. The first clamping portion has a first clamping sub-portion and a second clamping sub-portion distributed along a length direction. The second pair of clamping arms forms a second clamping portion. The second clamping portion has a third clamping sub-portion and a fourth clamping sub-portion distributed along the length direction. The first clamping sub-portion corresponds to the third clamping sub-portion in the length direction. A width of the first clamping sub-portion is greater than a width of the third clamping sub-portion. The second clamping sub-portion corresponds to the fourth clamping sub-portion in the length direction. A width of the second clamping sub-portion is less than a width of the fourth clamping sub-portion.

20 Claims, 4 Drawing Sheets

(56) References Cited

U.S. PATENT DOCUMENTS

| | | | |
|---|---|---|---|
| 2007/0167048 | A1 | 7/2007 | Puettner et al. |
| 2015/0380851 | A1 | 12/2015 | Zhao |
| 2019/0348785 | A1 | 11/2019 | Tsai |
| 2021/0184375 | A1 | 6/2021 | Schneider |

FOREIGN PATENT DOCUMENTS

| | | | |
|---|---|---|---|
| JP | H08185939 | A | 7/1996 |
| WO | 2019019000 | A1 | 1/2019 |

* cited by examiner

CONDUCTIVE TERMINAL

CROSS-REFERENCE TO RELATED APPLICATIONS

This application claims the benefit of the filing date under 35 U.S.C. § 119(a)-(d) of Chinese Patent Application No. 202211123406.X, filed on Sep. 15, 2022.

FIELD OF THE INVENTION

The present disclosure relates to insulation displacement connection technology, in particular to a conductive terminal capable of connecting multiple wires.

BACKGROUND

A conductive terminal includes a clamping portion formed with two clamping arms used to clamp and electrically connect with wires. However, the clamping portion is propped open when clamping multiple wires, impairing the electrical connection with the second wire and/or the third wire clamped subsequently. To ensure an effective electrical connection with multiple wires, the user must use multiple conductive terminals and, consequently, the product cost is increased and more space is occupied.

SUMMARY

A conductive terminal includes a first pair of clamping arms forming a first clamping portion for connecting with a wire, and a second pair of clamping arms connected to the first pair of clamping arms by a connecting part. The first clamping portion has a first clamping sub-portion and a second clamping sub-portion distributed along a length direction. The second pair of clamping arms forms a second clamping portion. The second clamping portion has a third clamping sub-portion and a fourth clamping sub-portion distributed along the length direction. The first clamping sub-portion corresponds to the third clamping sub-portion in the length direction. A width of the first clamping sub-portion is greater than a width of the third clamping sub-portion. The second clamping sub-portion corresponds to the fourth clamping sub-portion in the length direction. A width of the second clamping sub-portion is less than a width of the fourth clamping sub-portion.

BRIEF DESCRIPTION OF THE DRAWINGS

The invention will now be described by way of example with reference to the accompanying Figures, of which.

DETAILED DESCRIPTION OF THE EMBODIMENT(S)

Figures 1A, 1B:
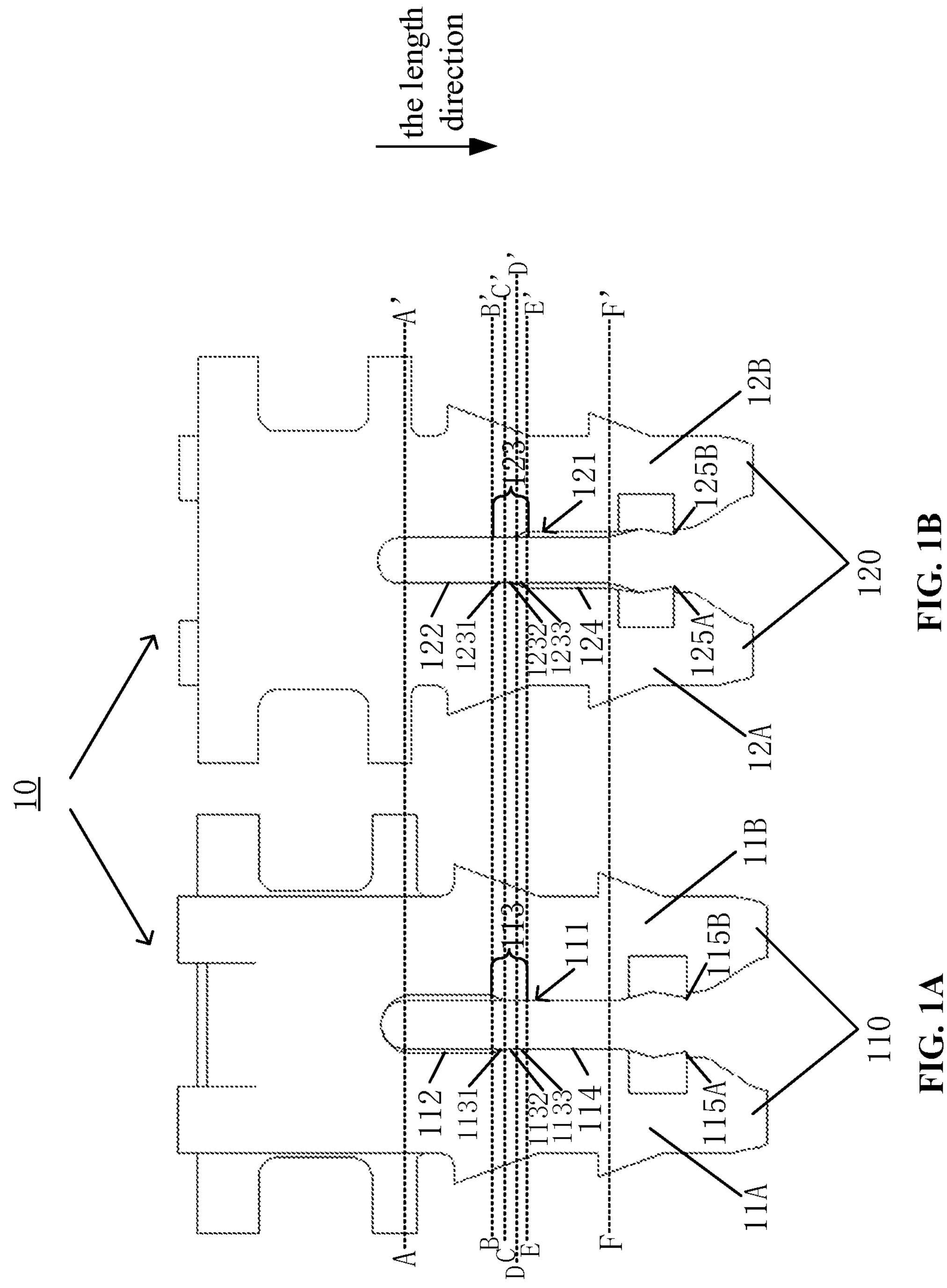
FIG. 1A is a schematic plan view of a front side of a conductive terminal according to an embodiment.
FIG. 1B is a schematic plan view of a back side of the conductive terminal.

The implementation and usage of the embodiments are discussed in detail below. However, the specific embodiments discussed herein are merely intended to illustrate specific ways of implementing and using the present disclosure, and are not intended to limit the scope of the present disclosure. When describing the components, the expressions herein, such as "upper end", "lower end", "left", "right", "upper", and "lower", are not absolute, but relative. When the components are arranged as shown in the drawings, these expressions are appropriate, but when the positions of these components in the drawings are altered, these expressions should be altered accordingly.

FIGS. 1A and 1B show the structure of the front side and back side of the conductive terminal 10, which is used for connecting the wire. The wire mentioned herein is a type of magnet wire, also known as winding wire, which is the insulated wire used to manufacture coils or windings of electrical products. Electromagnetic wires are usually classified into enameled wires, covered wires, enameled covered wire, and inorganic insulated wires, etc. Referring to FIGS. 1A-3, the conductive terminal 10 includes a first pair of clamping arms (11A, 11B) and a second pair of clamping arms (12A, 12B).

Figure 2:
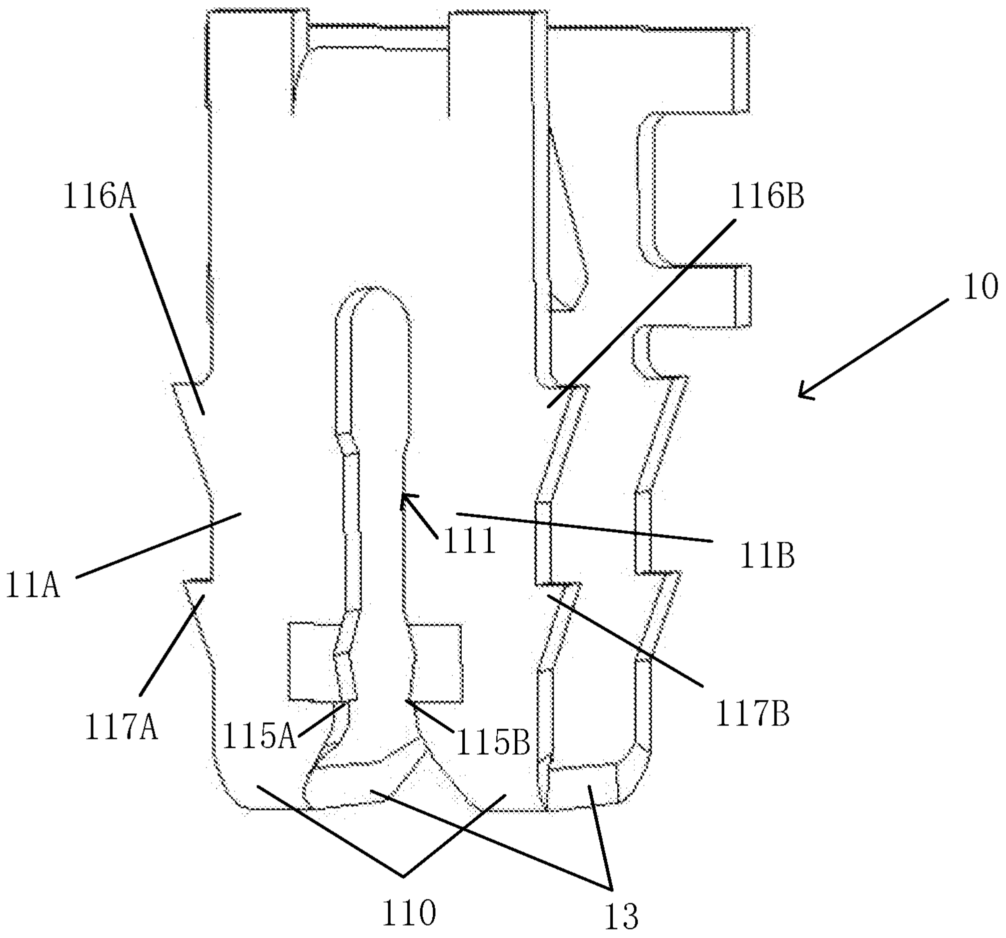
FIG. 2 is a schematic perspective view of the front side of the conductive terminal according to an embodiment.
Figure 3:
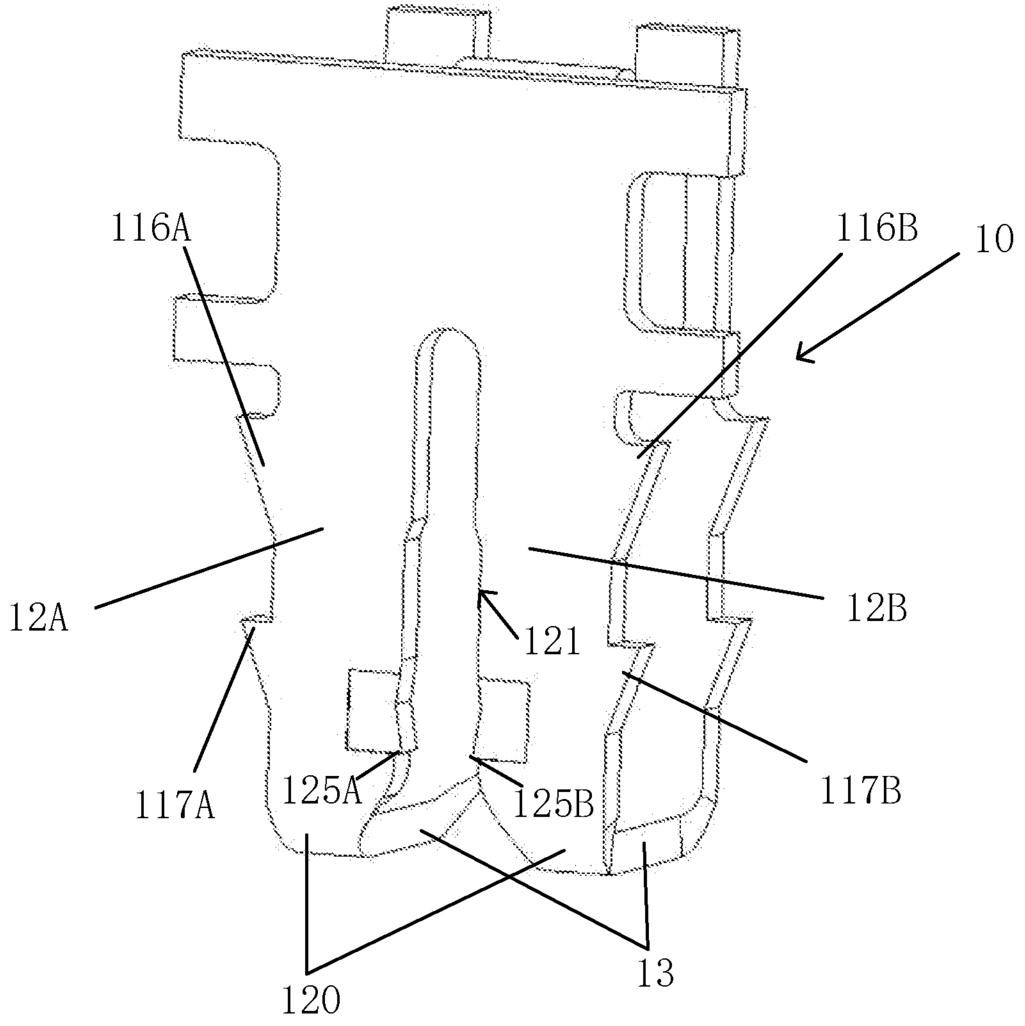
FIG. 3 is a schematic perspective view of the back side of the conductive terminal according to an embodiment.

In practical use, the operator inserts the conductive terminal 10 shown in FIG. 2 or 3 downwards into a terminal frame to connect a wire. Therefore, the uppermost portion of the clamping arms in FIGS. 1-4 herein is the top end of the clamping arms, and the lowest portion of the clamping arms is the bottom end of the clamping arms.

The top end of the first pair of clamping arms (11A, 11B) extends along the length direction to the bottom end 110 of the first pair of clamping arms (11A, 11B). The first pair of clamping arms 11A, 11B forms a first clamping portion 111 for connecting a wire.

The first clamping portion 111 includes a first clamping sub-portion 112 and a second clamping sub-portion 114 distributed along the length direction, as shown in FIG. 1A. The first clamping portion 111 also includes a first clamping transition segment 113. And in this example, the first clamping sub-portion 112, the first clamping transition segment 113, and the second clamping sub-portion 114 are arranged to be distributed along the length direction, and are engaged sequentially from top to bottom. As shown in FIG. 1, in order to better explain the clamping portions of the terminal 10, the drawing are marked with the horizontal lines AA' to FF'. The first clamping sub-portion 112 of the first clamping portion 111 is located in the area between AA 'and BB', the first clamping transition segment 113 is located in the area between BB' and EE', and the second clamping sub-portion 114 is located in the area between EE' and FF'.

The top end of the second pair of clamping arms (12A, 12B) of the conductive terminal 10 extends along the length direction to the bottom end 120 of the second pair of clamping arms (12A, 12B), as shown in FIG. 1B. The second pair of clamping arms (12A, 12B) are connected to the first pair of clamping arms (11A, 11B) by the connecting part 13, shown in FIGS. 2 and 3. In this example, the connecting part 13 is arranged to connect the bottom end 110 of the first pair of clamping arms (11A, 11B) with the bottom end 120 of the second pair of clamping arms (12A, 12B). In other examples, the connecting part 13 can also be arranged to connect other parts of the clamping arms (11A, 11B)

(12A, 12B) to achieve coupling. The second pair of clamping arms (12A, 12B) forms a second clamping portion 121 for connecting a wire.

The second clamping portion 121 includes a third clamping sub-portion 122 and a fourth clamping sub-portion 124 distributed along the length direction, as shown in FIG. 1B. Further, the second clamping portion 121 also includes a second clamping transition segment 123. In this example, the third clamping sub-portion 122, the second clamping transition segment 123, and the fourth clamping sub-portion 124 are arranged to be distributed along the length direction, and are engaged sequentially from top to bottom. In particular, the third clamping sub-portion 122 is located in the area between AA 'and BB', which corresponds to the first clamping sub-portion 112 of the first clamping portion 111 in the length direction. The second clamping transition segment 123 is located in the area between BB 'and EE', which corresponds to the first clamping transition segment 113 of the first clamping portion 111 in the length direction. The fourth clamping sub-portion 124 is located in the area between EE 'and FF', which corresponds to the second clamping sub-portion 114 of the first clamping portion 111 in the length direction.

In addition to the first clamping portion 111 and the second clamping portion 121 for connecting a wire, the first pair of clamping arms (11A, 11B) and the second pair of clamping arms (12A, 12B) further include the raised edge for scraping off the insulation layer of the wire. In particular, the first pair of clamping arms (11A, 11B) include a first pair of raised edges (115A, 115B), shown in FIGS. 1A and 2, which are sharp. The first pair of raised edges (115A, 115B) are disposed on the arm portions opposite to each other of the first pair of clamping arms (11A, 11B). The second pair of clamping arms (12A, 12B) include a second pair of raised edges (125A, 125B), shown in FIGS. 1B and 3, which are sharp. The second pair of raised edges (125A, 125B) are disposed on the arm portions opposite to each other of the second pair of clamping arms (12A, 12B). The first pair of raised edges (115A, 115B) and the second pair of raised edges (125A, 125B) are all configured to scrape off the insulation layer of the wire.

Figures 4A, 4B:
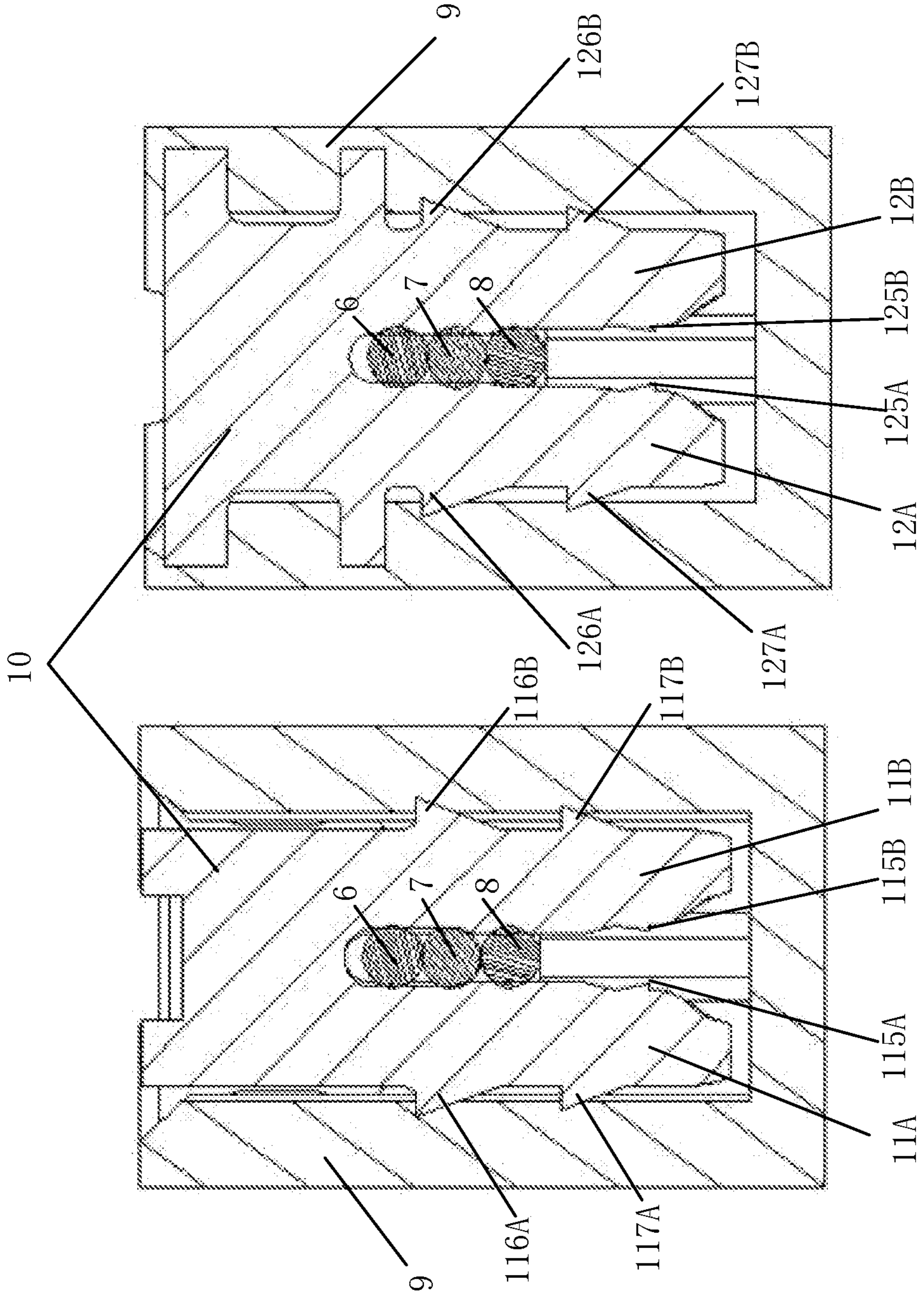
FIG. 4A is a schematic sectional view of the front side of the conductive terminal connected to wires in a terminal frame according to an embodiment.
FIG. 4B is a schematic sectional view of the back side of the conductive terminal connected to wires in the terminal frame.

As shown in FIGS. 4A and 4B, when the conductive terminal 10 is inserted downwards into the terminal frame 9 with three wires 6, 7, 8 placed therein, the first pair of raised edges (115A, 115B) and the second pair of raised edges (125A, 125B) of the conductive terminal 10 scrape off the insulation layers of the three wires 6, 7, 8, respectively. With the conductive terminal 10 moving further downwards, the three wires 6, 7, 8 are finally clamped in the first clamping portion 111 and the second clamping portion 121.

For the first clamping sub-portion 112 and the third clamping sub-portion 122, both of which are located between AA 'and BB', since the width of the first clamping sub-portion 112 is arranged to be greater than the width of the third clamping sub-portion 122, the positive force required for clamping is mainly provided by the third clamping sub-portion 122 of the second clamping portion 121. For the second clamping sub-portion 114 and the fourth clamping sub-portion 124 both of which are located between EE 'and FF', since the width of the second clamping sub-portion 114 is arranged to be less than the width of the fourth clamping sub-portion 124, the positive force required for clamping is mainly provided by the second clamping sub-portion 114 of the first clamping portion 111. As a result, the positive force for clamping multiple wires is provided by the first clamping portion 111 and the second clamping portion 121 together, thereby preventing the first clamping portion 111 or the second clamping portion 121 from being propped open and deformed, and avoiding negative effect to its electrical connections with the wires.

In this embodiment, the width of the first clamping sub-portion 112 is arranged the same as the width of the fourth clamping sub-portion 124, and the width of the second clamping sub-portion 114 is arranged the same as the width of the third clamping sub-portion 122. And in order to ensure better electrical connection, both widths of the first clamping sub-portion 112 and the fourth clamping sub-portion 124 are less than the outer diameter of the wire. In an embodiment, the first clamping transition segment 113 of the first clamping portion 111 and the second clamping transition segment 123 of the second clamping portion 121 are further specified herein. Thus, the positive force to which the multiple wires are subjected at the clamping transition segments is also provided by the first clamping portion 111 and the second clamping portion 121 together, preventing the first clamping portion 111 or the second clamping portion 121 from being propped open and deformed, so as to avoid negative effect to the electrical connections between the terminal 10 and the wires.

The first clamping transition segment 113 is configured to transition from the width of the first clamping sub-portion 112 to the width of the second clamping sub-portion 114 along the length direction, enabling the first clamping portion 111 to clamp multiple wires successively along the length direction. Specifically, as shown in FIG. 1A, the first clamping transition segment 113 includes a first clamping sub-segment 1131, a third clamping sub-segment 1132, and a second clamping sub-segment 1133 distributed along the length direction. And in this example, the first clamping sub-segment 1131, the third clamping sub-segment 1132, and the second clamping sub-segment 1133 are arranged to be engaged sequentially from top to bottom along the length direction. The first clamping sub-segment 1131 is located in the area between BB 'and CC'. The third clamping sub-segment 1132 is located in the area between CC 'and DD'. The second clamping sub-segment 1133 is located in the area between DD 'and EE'. The width of the first clamping sub-segment 1131 is arranged to transition from the width of the first clamping sub-portion 112 to the width of the second clamping sub-portion 114 along the length direction. Both widths of the third clamping sub-segment 1132 and the second clamping sub-segment 1133 are arranged the same as the width of the second clamping sub-segment 114.

The second clamping transition segment 123 is configured to transition from the width of the third clamping sub-portion 122 to the width of the fourth clamping sub-portion 124 along the length direction, enabling the second clamping portion 121 to clamp multiple wires successively along the length direction. Both of the first clamping transition segment 113 and the second clamping transition segment 123 are arranged to include fillet transition structures or oblique transition structures. In particular, as shown in FIG. 1B, the second clamping transition segment 123 includes a first mated clamping sub-segment 1231, a third mated clamping sub-segment 1232, and a second mated clamping sub-segment 1233 distributed along the length direction. And in this example, the first mated clamping sub-segment 1231, the third mated clamping sub-segment 1232, and the second mated clamping sub-segment 1233 are arranged to be engaged sequentially from top to bottom along the length direction. The first mated clamping sub-segment 1231 is located in the area between BB' and CC', which corresponds to the first clamping sub-segment 1131 of the first clamping transition segment 113 in the length direction. The third mated clamping sub-segment 1232 is located in the area between CC' and DD', which corresponds to the third clamping sub-segment 1132 of the first clamping transition segment 113 in the length direction. The second mated clamping sub-segment 1233 is located in the area between DD' and EE', which corresponds to the second clamping sub-segment 1133 of the first clamping transition segment 113 in the length direction. Both widths of the first mated clamping sub-segment 1231 and the third mated clamping sub-segment 1232 are arranged the same as the width of the third clamping sub-portion 122. The width of the second mated clamping sub-segment 1233 is arranged to transition from the width of the third clamping sub-portion 122 to the width of the fourth clamping sub-portion 124 along the length direction. One of the clamping sub-portions, clamping transition segments, or clamping sub-segments present above corresponds to another one in the length direction, which refers to that their positions are roughly even in the length direction and they cooperate to clamp the wire.

With the settings above and referring to FIGS. 1A and 1B, it can be seen that for the first clamping sub-segment 1131 and the first mated clamping sub-segment 1231, both of which are located between BB' and CC', since the width of the first clamping sub-segment 1131 is greater than the width of the first mated clamping sub-segment 1231, the positive force required for clamping at this position is mainly provided by the first mated clamping sub-segment 1231 of the second clamping portion 121. For the third clamping sub-segment 1132 and the third mated clamping sub-segment 1232, both of which are located between CC' and DD', the width of the third clamping sub-segment 1132 is the same as the width of the third mated clamping sub-segment 1232, such that the positive force at this position is provided by the first clamping portion 111 and the second clamping portion 121 together. However, due to the small size of the area at this position, it will not cause the clamping arms to be propped open. For the second clamping sub-segment 1133 and the second mated clamping sub-segment 1233 both of which are located between DD' and EE', since the width of the second clamping sub-segment 1133 is less than the width of the second mated clamping sub-segment 1233, the positive force required for clamping at this position is mainly provided by the second clamping sub-segment 1133 of the first clamping portion 111. To sum up, the positive force to which the multiple wires are subjected at the clamping transition segments is also provided by the first clamping portion 111 and the second clamping portion 121 together.

Referring to FIGS. 4A and 4B, when the conductive terminal 10 is used to connect three wires 6, 7, 8, the first wire 6 is fixed in the first clamping portion 112 and the third clamping portion 122, and the positive force for clamping the wire is mainly provided by the third clamping sub-portion 122 of the second clamping portion 121. The second wire 7 is generally fixed at the upper half sections of the first clamping transition segment 113 and the second clamping transition segment 123, and the positive force for clamping the wire is mainly provided by the second clamping portion 121. The third wire 8 is generally fixed at the lower half sections of the first clamping transition segment 113 and the second clamping transition segment 123, and the positive force for clamping the wire is mainly provided by the first clamping portion 111.

In other examples, the first clamping transition segment 113 may not include the third clamping sub-segment 1132, and the second clamping transition segment 123 may not include the third mated clamping sub-segment 1232. In this case, the first clamping sub-segment 1131 and the second clamping sub-segment 1133 are arranged to be engaged sequentially from top to bottom along the length direction, and the first mated clamping sub-segment 1231 and the second mated clamping sub-segment 1233 are arranged to be engaged sequentially from top to bottom along the length direction.

The first pair of clamping arms (11A, 11B) in this embodiment include a first pair of locking portions (116A, 116B) extending outwardly from both sides of the first pair of clamping arms. The second pair of clamping arms (12A, 12B) include a second pair of locking portions (126A, 126B) extending outwardly from both sides of the second pair of clamping arms. The first pair of locking portions (116A, 116B) and the second pair of locking portions (126A, 126B) are configured to lock the conductive terminal 10 in the terminal frame 9 when the conductive terminal 10 is inserted into the terminal frame 9, as shown in FIGS. 4A and 4B. In this embodiment, the first pair of locking portions (116A, 116B) and the second pair of locking portions (126A, 126B) overlap in the length direction. In particular, four grooves are disposed on the inner wall of the terminal frame 9 for locking the conductive terminal 10. When the conductive terminal 10 is inserted into the terminal frame 9 to crimp the wire, four locking portions which are similar to barbs are accommodated in the four grooves and locked by the grooves, such that the conductive terminal 10 is locked in and cannot come out.

Additionally, the first pair of clamping arms (11A, 11B) further include a third pair of locking portions (117A, 117B), shown in FIG. 4A, extending outwardly from both sides of the first pair of clamping arms. The second pair of clamping arms (12A, 12B) further include a fourth pair of locking portions (127A, 127B), shown in FIG. 4B, extending outwardly from both sides of the second pair of clamping arms. The third pair of locking portions (117A, 117B) and the fourth pair of locking portions (127A, 127B) are configured to lock the conductive terminal 10 in the terminal frame 9 when the conductive terminal 10 is inserted into the terminal frame 9. In this embodiment, the structures of the third pair of locking portions (117A, 117B) and the fourth pair of locking portions (127A, 127B) are similar to the structures of the first pair of locking portions (116A, 116B) and the second pair of locking portions (126A, 126B). The third pair of locking portions (117A, 117B) and the fourth pair of locking portions (127A, 127B) also adopt the barb-like structures. When the conductive terminal 10 is inserted into the terminal frame 9, the third pair of locking portions (117A, 117B) and the fourth pair of locking portions (127A, 127B) enter the grooves on the inner wall of the terminal frame 9, which prevents the conductive terminal 10 from coming out from the terminal frame 9.

The third pair of locking portions (117A, 117B) are closer to the bottom end 110 of the first pair of clamping arms (11A, 11B) in the length direction compared to the first pair of locking portions (116A, 116B), and the fourth pair of locking portions (127A, 127B) are closer to the bottom end 120 of the second pair of clamping arms (12A, 12B) in the length direction compared to the second pair of locking portions (126A, 126B). Referring to the drawing, the third pair of locking portions (117A, 117B) and the fourth pair of locking portions (127A, 127B) are disposed in lower positions. In this embodiment, the third pair of locking portions (117A, 117B) and the fourth pair of locking portions (127A, 127B) overlap in the length direction. When the third pair of locking portions (117A, 117B) and the fourth pair of locking portions (127A, 127B) enter the grooves on the inner wall of the terminal frame 9, they can prevent the first pair of clamping arms (11A, 11B) and the second pair of clamping arms (12A, 12B) from being propped open when clamping multiple wires, thereby ensuring good electrical contact between the terminal 10 and the wires.

With the conductive terminal provided in the embodiments herein, the clamping arms of the terminal are prevented from being propped open excessively when connecting with multiple wires, and there is a good electrical connection between the terminal and the wire. Compared to conductive terminals in the prior art that can only connect one or two wires, this terminal can be used to effectively electrically connect with multiple wires, which saves space and cost, and improves production efficiency.

Although the present disclosure has been described with reference to specific examples, these examples are merely illustrative and not intended to limit the present disclosure. In the present invention, the clamping sub-portions and the clamping transition segments (including the clamping sub-segments) are arranged in a certain order, and the clamping portions which have the above order of arrangement shall fall within the protection scope of the present invention. Changes, additions, or deletions to the disclosed embodiments can be made without departing from the spirit and scope of protection of the present disclosure.

What is claimed is:

1. A conductive terminal, comprising:

a first pair of clamping arms forming a first clamping portion for connecting with a wire, the first clamping portion has a first clamping sub-portion and a second clamping sub-portion distributed along a length direction; and a second pair of clamping arms connected to the first pair of clamping arms by a connecting part, the second pair of clamping arms forming a second clamping portion for connecting with the wire, the second clamping portion has a third clamping sub-portion and a fourth clamping sub-portion distributed along the length direction, the first clamping sub-portion corresponds to the third clamping sub-portion in the length direction, a width of the first clamping sub-portion is greater than a width of the third clamping sub-portion, the second clamping sub-portion corresponds to the fourth clamping sub-portion in the length direction, a width of the second clamping sub-portion is less than a width of the fourth clamping sub-portion.

2. The conductive terminal according to claim 1, wherein the first clamping portion has a first clamping transition segment and the second clamping portion has a second clamping transition segment, the first clamping sub-portion, the first clamping transition segment, and the second clamping sub-portion are arranged distributed along the length direction, the third clamping sub-portion, the second clamping transition segment, and the fourth clamping sub-portion are arranged distributed along the length direction, the first clamping transition segment corresponds to the second clamping transition segment in the length direction.

3. The conductive terminal according to claim 1, wherein the width of the first clamping sub-portion and the width of the fourth clamping sub-portion are both less than an outer diameter of the wire.

4. The conductive terminal according to claim 2, wherein the width of the first clamping sub-portion is equal to the width of the fourth clamping sub-portion.

5. The conductive terminal according to claim 4, wherein the width of the second clamping sub-portion is equal to the width of the third clamping sub-portion.

6. The conductive terminal according to claim 2, wherein the first clamping sub-portion, the first clamping transition segment, and the second clamping sub-portion are arranged to be engaged sequentially from top to bottom along the length direction, the third clamping sub-portion, the second clamping transition segment, and the fourth clamping sub-portion are arranged to be engaged sequentially from top to bottom along the length direction.

7. The conductive terminal according to claim 5, wherein the first clamping transition segment has a first clamping sub-segment and a second clamping sub-segment distributed along the length direction, a width of the first clamping sub-segment transitions from the width of the first clamping sub-portion to the width of the second clamping sub-portion along the length direction, a width of the second clamping sub-segment is equal to the width of the second clamping sub-portion.

8. The conductive terminal according to claim 7, wherein the second clamping transition segment has a first mated clamping sub-segment and a second mated clamping sub-segment distributed along the length direction, a width of the first mated clamping sub-segment is equal to the width of the third clamping sub-portion, a width of the second mated clamping sub-segment transitions from the width of the third clamping sub-portion to the width of the fourth clamping sub-portion along the length direction.

9. The conductive terminal according to claim 8, wherein the first clamping sub-segment corresponds to the first mated clamping sub-segment in the length direction, and the second clamping sub-segment corresponds to the second mated clamping sub-segment in the length direction.

10. The conductive terminal according to claim 9, wherein the first clamping transition segment has a third clamping sub-segment distributed along the length direction, a width of the third clamping sub-segment is equal to the width of the second clamping sub-portion, the first clamping sub-segment, the third clamping sub-segment, and the second clamping sub-segment are arranged to be engaged sequentially from top to bottom along the length direction.

11. The conductive terminal according to claim 10, wherein the second clamping transition segment has a third mated clamping sub-segment distributed along the length direction, a width of the third mated clamping sub-segment is equal to the width of the third clamping sub-portion, the first mated clamping sub-segment, the third mated clamping sub-segment, and the second mated clamping sub-segment are arranged to be engaged sequentially from top to bottom along the length direction, the third clamping sub-segment corresponds to the third mated clamping sub-segment in the length direction.

12. The conductive terminal according to claim 9, wherein the first clamping sub-segment and the second clamping sub-segment are engaged sequentially from top to bottom along the length direction, the first mated clamping sub-segment and the second mated clamping sub-segment are engaged sequentially from top to bottom along the length direction.

13. The conductive terminal according to claim 2, wherein both of the first clamping transition segment and the second clamping transition segment have a plurality of fillet transition structures.

14. The conductive terminal according to claim 2, wherein both of the first clamping transition segment and the second clamping transition segment have a plurality of oblique transition structures.

15. The conductive terminal according to claim 1, wherein the first pair of clamping arms includes a first pair of raised edges disposed on a pair of arm portions opposite to each other of the first pair of clamping arms, the second pair of clamping arms includes a second pair of raised edges disposed on a pair of arm portions opposite to each other of the second pair of clamping arms, the first pair of raised edges and the second pair of raised edges scrape off an insulation layer of the wire.

16. The conductive terminal according to claim 1, wherein the connecting part connects a bottom end of the first pair of clamping arms with a bottom end of the second pair of clamping arms.

17. The conductive terminal according to claim 1, wherein the first pair of clamping arms include a first pair of locking portions extending outwardly from a pair of sides of the first pair of clamping arms, the second pair of clamping arms include a second pair of locking portions extending outwardly from a pair of sides of the second pair of clamping arms, the first pair of locking portions and the second pair of locking portions lock the conductive terminal in a terminal frame when the conductive terminal is inserted into the terminal frame.

18. The conductive terminal according to claim 17, wherein the first pair of locking portions and the second pair of locking portions overlap in the length direction.

19. The conductive terminal according to claim 17, wherein the first pair of clamping arms include a third pair of locking portions extending outwardly from a pair of sides of the first pair of clamping arms, the second pair of clamping arms include a fourth pair of locking portions extending outwardly from a pair of sides of the second pair of clamping arms, the third pair of locking portions and the fourth pair of locking portions lock the conductive terminal in the terminal frame when the conductive terminal is inserted into the terminal frame, the third pair of locking portions is closer to a bottom end of the first pair of clamping arms in the length direction compared to the first pair of locking portions, the fourth pair of locking portions is closer to the bottom end of the second pair of clamping arms in the length direction compared to the second pair of locking portions.

20. The conductive terminal according to claim 19, wherein the third pair of locking portions and the fourth pair of locking portions overlap in the length direction.

* * * * *